US009020881B2

(12) United States Patent
Ritter et al.

(10) Patent No.: US 9,020,881 B2
(45) Date of Patent: Apr. 28, 2015

(54) PUBLIC SOLUTION MODEL IN AN ENTERPRISE SERVICE ARCHITECTURE

(75) Inventors: Gerd Martin Ritter, Heidelberg (DE); Stefan A. Baeuerle, Rauenberg (DE); Frank Brunswig, Heidelberg (DE); Thomas Fiedler, Pfinztal (DE); Jens Freund, Heidelberg (DE); Reiner Hammerich, Rauenberg (DE); Baré Said, St. Leon-Rot (DE); Guenter Pecht-Seibert, Muhlhausen (DE); Wolfgang Koch, Östringen-Odenheim (DE)

(73) Assignee: SAP SE, Walldorf (DE)

( * ) Notice: Subject to any disclaimer, the term of this patent is extended or adjusted under 35 U.S.C. 154(b) by 1586 days.

(21) Appl. No.: 12/339,304

(22) Filed: Dec. 19, 2008

(65) Prior Publication Data

US 2010/0161675 A1  Jun. 24, 2010

(51) Int. Cl.
*G06F 17/30* (2006.01)
*G06Q 10/10* (2012.01)

(52) U.S. Cl.
CPC .......... *G06Q 10/10* (2013.01); *G06F 17/30294* (2013.01)

(58) Field of Classification Search
CPC ..................... G06Q 10/10; G06F 17/30294
USPC ........................................................ 707/104.1
See application file for complete search history.

(56) References Cited

U.S. PATENT DOCUMENTS

| | | | | |
|---|---|---|---|---|
| 6,070,152 | A * | 5/2000 | Carey et al. | 705/35 |
| 6,106,569 | A * | 8/2000 | Bohrer et al. | 717/100 |
| 6,378,002 | B1 * | 4/2002 | Brobst et al. | 719/315 |
| 7,127,713 | B2 * | 10/2006 | Davis et al. | 717/177 |
| 7,770,146 | B2 * | 8/2010 | Brunswig et al. | 717/104 |
| 2002/0049749 | A1 * | 4/2002 | Helgeson et al. | 707/3 |
| 2009/0024424 | A1 * | 1/2009 | T et al. | 705/7 |
| 2010/0031247 | A1 * | 2/2010 | Arnold et al. | 717/174 |

\* cited by examiner

*Primary Examiner* — James Trujillo
*Assistant Examiner* — Grace Park
(74) *Attorney, Agent, or Firm* — Buckley, Maschoff & Talwalkar LLC

(57) ABSTRACT

A computer-implemented system may include an application platform comprising a platform model of a plurality of business objects, each of the business objects comprising a model of data and associated logic, and a public solution model comprising a subset of the platform model. The system may also include a business application, wherein a data model and access logic of the business application are defined based on the public solution model, and wherein the application platform is to provide services to the business application based on the data model, the access logic and the platform model.

16 Claims, 4 Drawing Sheets

PUBLIC SOLUTION MODEL IN AN ENTERPRISE SERVICE ARCHITECTURE

FIELD

Some embodiments relate to enterprise services based on business objects and supported by an application platform. More specifically, some embodiments relate to a public solution model to facilitate development of business applications using an application platform.

BACKGROUND

A business object is a software model representing real-world items used during the transaction of business. For example, a business object may represent a business document such as a sales order, a purchase order, or an invoice. A business object may also represent master data objects such as a product, a business partner, or a piece of equipment. Particular ones of such master data objects (e.g., SalesOrder SO435539, ACME corporation) are represented by instances of their representing business object, or business object instances.

A business object may specify business logic and/or data having any suitable structure. The structure of a business object may be determined based on the requirements of a business scenario in which the business object is to be deployed. A business application for a particular business scenario may require many business objects, where the structure of each business object has been determined based on the requirements of the particular business scenario.

A business process platform, or application platform, typically exposes a complex business object model, which will be referred to herein as the platform model. The platform model describes many business objects, their relations and dependencies. The platform model may be used by several business applications, or solutions, to access data and logic of business object instances. The applications, in turn, provide such data to end-users through user interfaces, reports, etc.

FIG. 1 is a block diagram of a conventional system. Platform 110 includes platform model 120, represented here by business object BO1 and business object BO2. Each business object exposes properties, some of which are related to another property via a specified cardinality. Solution 1 and Solution 2 are business applications developed based on platform model 120. For example, Solution 1 may comprise a user interface layer to provide user interfaces to end users, while Solution 2 may comprise a reporting layer for providing reports and analytics.

Direct exposure of a platform model to an application developer can be problematic. The complexity of the platform model provides flexibility in developing applications, but much of the complexity, which includes business and technical information, may be irrelevant to the application being developed. Consequently, although Solution 1 and Solution 2 may be directed to a same field of use, each application must constrain platform model 120 to the particular parameters of the field of use.

For example, platform model 120 may allow association of an employee with any number of work agreements (i.e., a 1 ... n cardinality). However, a particular field of use may require this relationship to be limited to exactly one work agreement per employee (i.e., a 1 ... 1 cardinality). Accordingly, this limitation must be implemented in Solution 1 and, independently, in Solution 2. Development of each application therefore requires restriction and simplification of the complete platform model according to the model needs of the application.

A platform model also associates information with a navigation path originating at the root node of a business object. Some information, such as a contact telephone number associated with a SalesOrder business object, may be associated with a long and cumbersome navigation path. Unfortunately, Solution 1 and Solution 2 must each use reference this entire navigation path each time a contact telephone number is referenced. Similar inefficiencies exist in the referencing of separate but related data (e.g., address data).

Moreover, the consuming business applications (e.g., Solution 1 and Solution 2) are not provided with fine-granular lifecycle management for the platform model with defined lifecycle statuses (e.g., released, deprecated, etc.).

DETAILED DESCRIPTION

Figure 1:
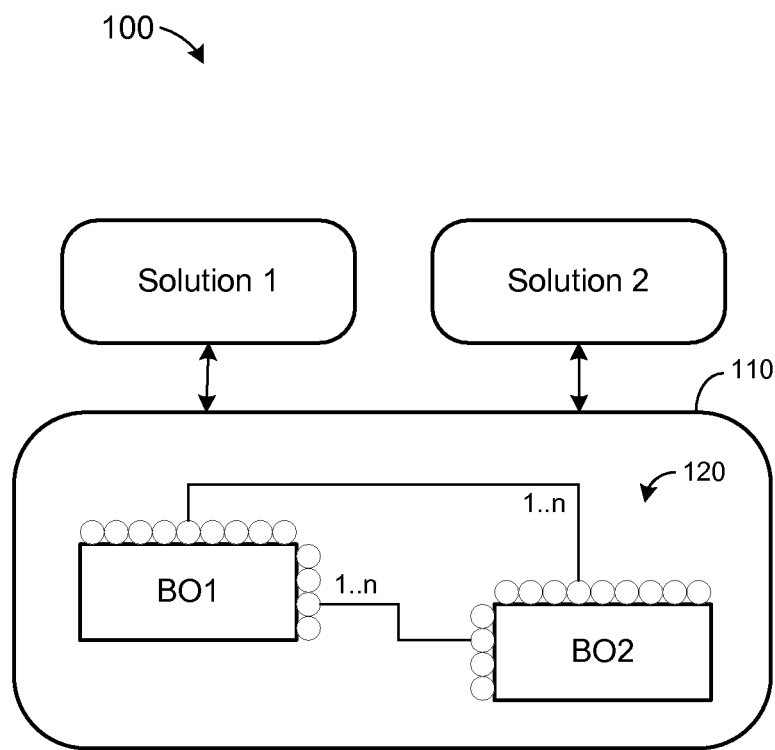
FIG. 1 is a block diagram illustrating a conventional system.
Figure 2:
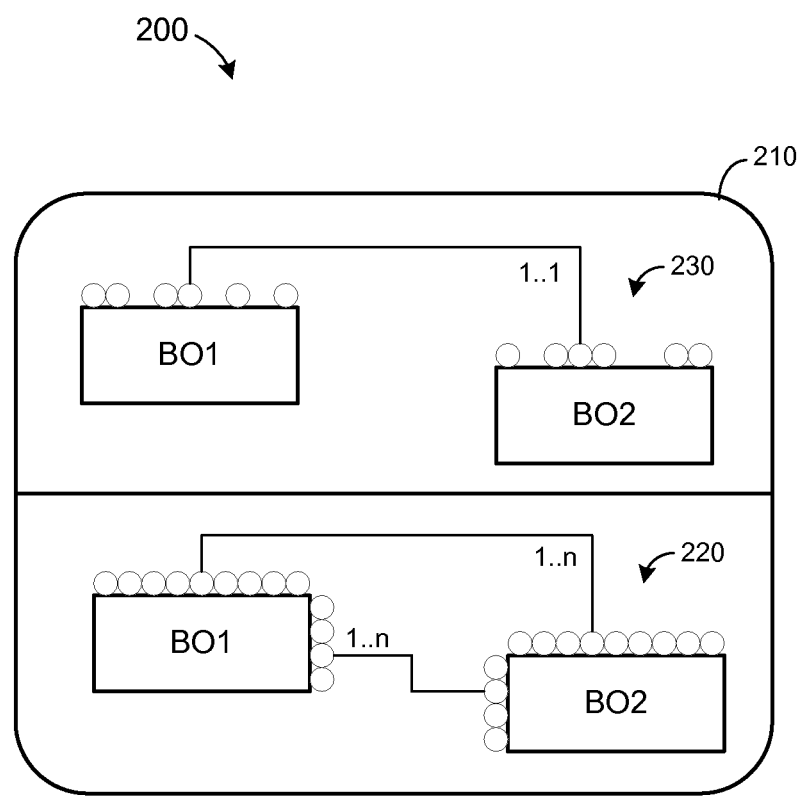
FIG. 2 is a block diagram illustrating a system according to some embodiments.

FIG. 2 is a block diagram of system 200 according to some embodiments. System 200 includes application platform 210, which in turn includes platform model 220 and public solution model 230. Application platform 210 may comprise an SAP application platform based on SAP Netweaver®, but is not limited thereto. In this regard, FIG. 2 represents a logical architecture for describing some embodiments, and actual implementations may include more or different components arranged in any manner.

System 200 represents a design-time architecture of application platform 210 according to some embodiments. Platform model 220 may comprise a conventional platform model such as that described above with respect to platform model 120. Platform model 220 may be represented by hierarchically-arranged metadata or any other software mechanism of application platform 210.

Public solution model 230 may also be defined by metadata of application platform 210. Public solution model 230 is a subset of platform model 220. That is, public solution model 230 exposes a subset of the services of platform 210. Public solution model 230 may be used in place of platform model 220 during development of all business applications (i.e., service consumers) such as, but not limited to a user interface layer, Web services (i.e., Compound Services), and forms.

Public solution model 230 may comprise a solution-specific view of platform model 220, and may provide features to facilitate the development of business applications (i.e., solutions) having some common requirements. Public solution model 230 may reflect a determination of which entities (e.g., nodes/attributes, etc.) or combinations of entities are often required by an application for proper functioning of the relevant business objects. The features of a public solution model described herein benefit a user during design-time. The user can be a developer on the application side, a partner, or the customer (e.g., adding extension fields to a screen). During runtime, an application developed using public solution model 230 typically interacts with application platform 210 without regard to public solution model 230. Exceptions to this mode include, for example, run-time checks on restrictions defined in public solution model 230 on webservices.

Public solution model 230, according to some embodiments, contains only elements which are also contained in platform model 220. Some elements of platform model 220 (e.g., relationship 225) may be usable by/visible to only the platform, and not available to public solution model 230. All other elements of platform model 220 may be reduced by public solution model 230 during design time. In other words, public solution model 230 may possess the same or fewer elements than platform model 220. For example, as shown, two entities associated by a 1 . . . n cardinality in platform model 220 may be associated by a 1 . . . 1 cardinality in public solution model 230. Also, a property enabled in platform model 220 may be disabled in public solution model 230. In some embodiments, public solution model 230 may add new fields as part of extensibility/flexiblity with additional logic using the exposed platform services.

Public solution model 230 allows the use of lifecycle management capabilities of application platform 210. It is possible for platform 210 to set a status of a service like released, deprecated/when deprecated, partially released, etc. The status can be set to fine granularity on all services of application platform 210 (e.g., attributes, properties, actions, data type). Propagation of a status setting (e.g., attribute changes to deprecated) is supported, and the status setting is visible on the business object level as well. This also holds true for exposure of services by public solution model 230 (e.g., for partners or end customers). For example, an attribute in public solution model 230 might be deprecated to be used in ad-hoc reports on the customer side.

Public solution model 230 may also provide shortcuts for typical navigation paths which are regularly required by several consumers (e.g., different user interfaces, Forms, A2X, Agents). For example, shortcut 230 shown in FIG. 3 may represent a navigation path to a contact telephone number. Selection of the particular navigation paths to be represented by shortcuts is business-driven.

The foregoing approach may be leveraged to provide a simplified denormalized view on a business object. For example, public solution model 230 may provide shortcuts to the navigation paths on a) sales order header and b) sales order item. The shortcuts may provide a consumer with a simplified view on the complex SalesOrder business object of platform model 220. A complex view remains available for use cases using the full capability of public solution model 230.

Figure 3:
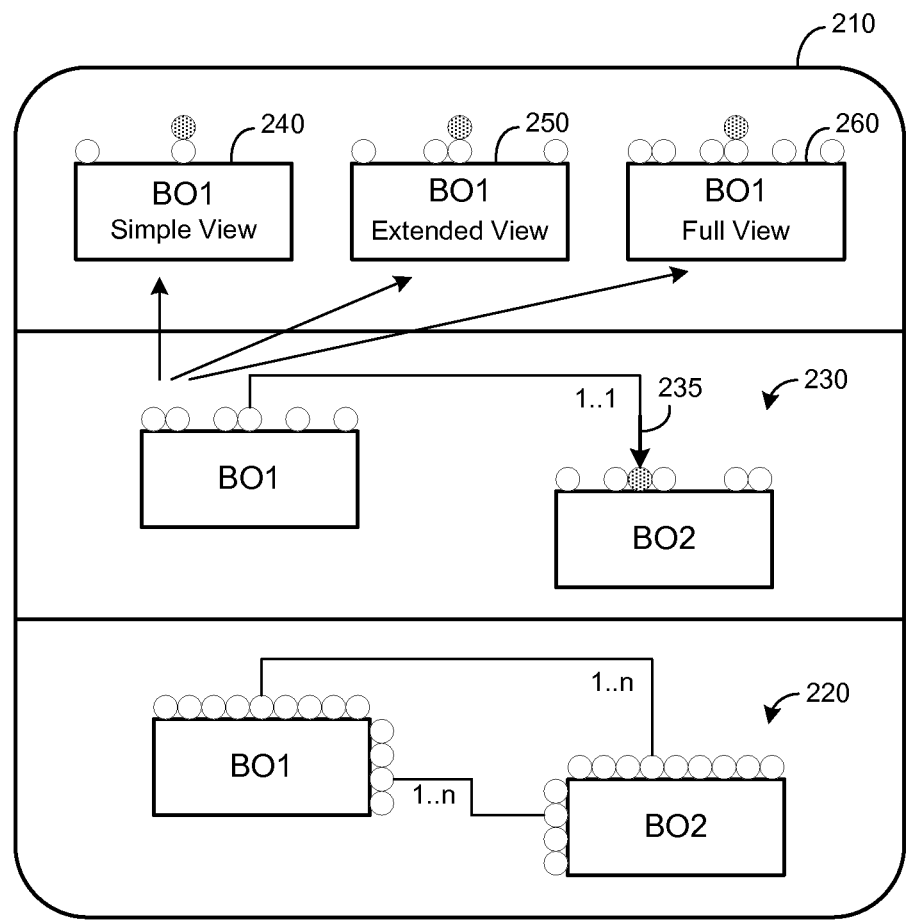
FIG. 3 is a block diagram illustrating a system according to some embodiments.

The above-mentioned shortcuts may be associated with a tag to indicate their relevance. A tag may indicate that an associated shortcut is required by most consumers (e.g., buyer name), or required by some consumers (e.g., telephone number of responsible employee). Tags or such indications may be used to facilitate the provision of different views on a same business object as shown in FIG. 3. As shown, Simple View 240 may include an object name and only data represented by shortcuts tagged as "required", Extended View 250 may include the data of Simple View 240 and data represented by shortcuts tagged as "useful", and Full View 260 may include all data of the business object exposed by public solution model 230.

Public solution model 230 may also or alternatively define a reuse UI block/Form block including data of several detail fields (e.g., an address block). A consumer may access the reuse block by providing only the anchor and the association in the public solution model to the reuse block. Access to the detail fields (e.g., telephone number) would otherwise require use of their respective full navigation paths. These navigation details, as well as the arrangement of the fields on the user interface/Form are part of the reuse group. The reuse groups may increase development efficiency, provide harmonization of user interfaces without manual constraints such as presentations or guidelines, and allow central changes to thusly-harmonized elements.

Some embodiments may incorporate an additional solution model on top of the above-described public solution model during design-time. The additional solution model may comprise a subset (i.e., including restrictions and simplifications only) of the public solution model. The additional solution model may therefore be related to the public solution model as the public solution model is related to the platform model. For example, an independent software vendor may design an "ISV" solution model based on the public solution model, and developers may create applications based on the ISV solution model to consume services of application platform 210 as described herein.

Figure 4:
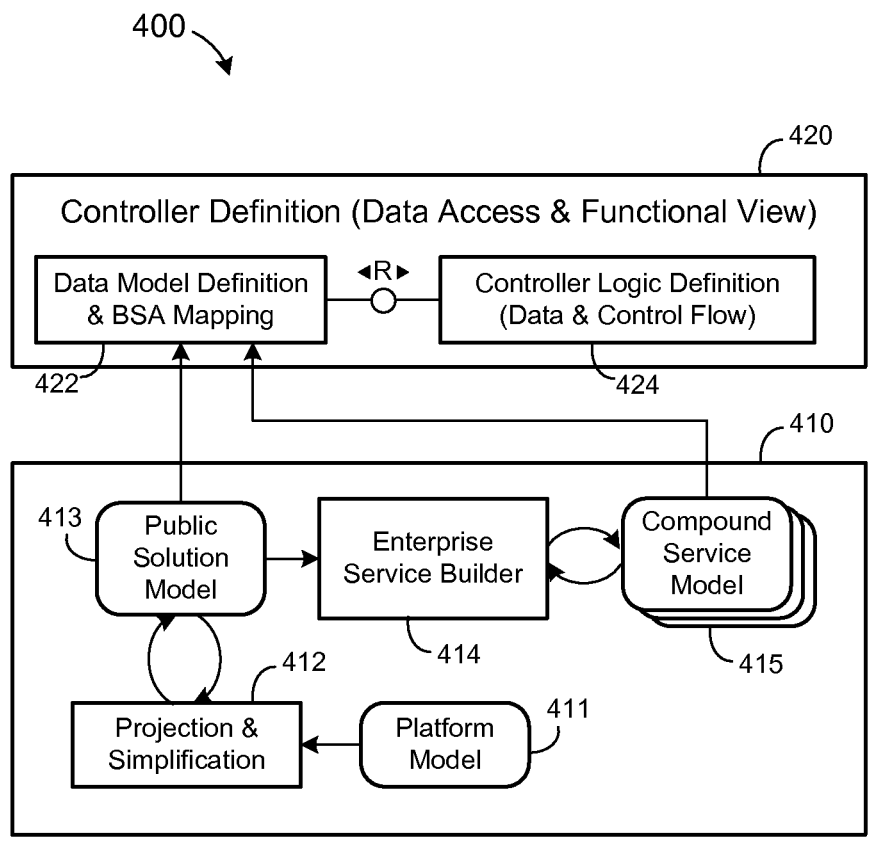
FIG. 4 is a general block diagram of a design time architecture according to some embodiments.

FIG. 4 is a block diagram of design-time architecture 400 according to some embodiments. Architecture 400 includes representations of application platform 410 and development environment 420. Application platform 410 may be use during runtime to provide services to applications developed using development environment 420.

As shown, projection and simplification tool 412 provides a mapping between platform model 411 and public solution model 413. A platform developer may use enterprise service builder 414 to build one or more compound service models 415 based on public solution model 413. Each of compound service models 415 describe services provided by application platform 410 which may be utilized by an application. Each of compound service models 415 may be specific to a particular application (i.e., solution). By virtue of the foregoing arrangement, the services use only those elements exposed by public solution model 413.

Data model definition and Backend Service Adapation (BSA) mapping 422 is created based on public solution model 413 and compound service model 415. Data model definition and BSA mapping 422 comprises an application-specific view of public solution model 413. In the case of a user interface layer, data model definition and BSA mapping 422 is designed for a specific floorplan. Controller logic definition 424 may provide transient fields for user interface control and view state (e.g., buffers for browse and collect, calculated fields, control of Previous and Next buttons, etc.).

Each system and device described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, a Zip™ disk, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer-implemented system comprising:
one or more computing devices to provide:
an application platform comprising:
a platform model of a plurality of business objects and services, each of the business objects and services comprising a model of data and associated logic; and
a public solution model comprising a subset of the platform model, and
a business application, wherein a data model and access logic of the business application are defined based on the public solution model,
wherein the application platform is to provide services to the business application based on the data model and the access logic of the business application and the platform model,
wherein the public solution model includes an element that is a reduced version of, and separate from, an element of the platform model, and
wherein the business application is to interact with the element of the platform model in a same manner as the business application is to interact with the element of the public solution model.

2. A system according to claim 1, further comprising:
a development environment to define the data model and the access logic of the business solution based on the public solution model.

3. A system according to claim 1, the application platform further comprising:
a compound service model based on the public solution model,
wherein the data model and access logic of the business application are defined based on the compound service model.

4. A system according to claim 1, the application platform to provide lifecycle management of the services to the business application based on the public solution model.

5. A system according to claim 1, wherein the platform model is associated with a navigation path to particular data of a business object,
wherein the public solution model exposes the particular data using a shortcut representing the navigation path, and
wherein the business application provides multiple views of the business object.

6. A system according to claim 1, wherein the business application is to interact with the element of the public solution model during design time.

7. A system according to claim 1, wherein the business application is to interact with the element of the platform model during runtime.

8. A system according to claim 1, wherein the business application is to interact with the element of the platform model during runtime in the same manner as the business application is to interact with the element of the public solution model during design time.

9. A method comprising:
defining a public solution model based on a platform model of a plurality of business objects and services of an application platform, each of the business objects and services comprising a model of data and associated logic, and the determined public solution model comprising a subset of the platform model; and
defining a data model and access logic of a business application based on the public solution model,
wherein the application platform is to provide services to the business application based on the data model and the access logic of the business application and the platform model,
wherein the public solution model includes an element that is a reduced version of, and separate from, an element of the platform model, and
wherein the business application is to interact with an element of the platform model in a same manner as the business application is to interact with an element of the public solution model.

10. A method according to claim 9, further comprising:
defining a compound service model based on the public solution model,
wherein the data model and access logic of the business application are defined based on the compound service model.

11. A method according to claim 9, wherein the application platform is to provide lifecycle management of the services to the business application based on the public solution model.

12. A method according to claim 9, wherein defining the platform model comprises:
defining a shortcut associated with a navigation path to particular data of a business object, and
wherein defining the business application comprises:
defining a view of the business object based on the shortcut.

13. A method according to claim 9, wherein the business application is to interact with the element of the public solution model during design time.

14. A method according to claim 9, wherein the business application is to interact with the element of the platform model during runtime.

15. A method according to claim 9, wherein the business application is to interact with the element of the platform model during runtime in the same manner as the business application is to interact with the element of the public solution model during design time.

16. A computer-implemented system comprising:
one or more computing devices to provide:
an application platform comprising:
a platform model of a plurality of business objects and services, each of the business objects and services comprising a model of data and associated logic; and
a public solution model comprising a subset of the platform model, and
a business application, wherein a data model and access logic of the business application are defined based on the public solution model,
wherein the application platform is to provide services to the business application based on the data model and the access logic of the business application and the platform model,
wherein the public solution model includes an element that is a reduced version of, and separate from, an element of the platform model, and
wherein the business application is to interact with an element of the platform model during runtime in a same manner as the business application is to interact with an element of the public solution model during design time.

* * * * *